US007756997B2

(12) United States Patent
Memon et al.

(10) Patent No.: US 7,756,997 B2
(45) Date of Patent: Jul. 13, 2010

(54) EFFECTIVE POLICIES AND POLICY ENFORCEMENT USING CHARACTERIZATION OF FLOW CONTENT AND CONTENT-INDEPENDENT FLOW INFORMATION

(75) Inventors: Nasir Memon, Holmdel, NJ (US); Kulesh Shanmugasundaram, Bronx, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 723 days.

(21) Appl. No.: 11/523,764

(22) Filed: Sep. 19, 2006

(65) Prior Publication Data

US 2007/0088845 A1    Apr. 19, 2007

Related U.S. Application Data

(60) Provisional application No. 60/718,384, filed on Sep. 19, 2005.

(51) Int. Cl.
*G06F 15/16* (2006.01)

(52) U.S. Cl. .................. 709/238; 709/234; 709/224; 703/27

(58) Field of Classification Search .......... 709/238, 709/234, 224; 703/27
See application file for complete search history.

(56) References Cited

U.S. PATENT DOCUMENTS

| 7,415,484 | B1 * | 8/2008 | Tulkoff et al. ............ 707/104.1 |
| 2001/0051864 | A1 * | 12/2001 | Kerr et al. ................ 703/27 |
| 2002/0099814 | A1 * | 7/2002 | Mastrianni ............... 709/224 |

\* cited by examiner

*Primary Examiner*—Wing F Chan
*Assistant Examiner*—Ruolei Zong
(74) *Attorney, Agent, or Firm*—Straub & Pokotylo; John C. Pokotylo

(57) ABSTRACT

Flexible network policies might be enforced by (a) obtaining a flow of network packets, (b) determining a content characteristic by characterizing content of the flow using bit-stream level statistics, (c) determining content-independent flow characteristics, port-independent flow characteristics, and/or application header-independent flow characteristics, and (d) enforcing a policy on the flow using both (1) the determined content characteristic and the (2) determined content-independent flow characteristics, port-independent flow characteristics, and/or application header-independent flow characteristics.

20 Claims, 6 Drawing Sheets

EFFECTIVE POLICIES AND POLICY ENFORCEMENT USING CHARACTERIZATION OF FLOW CONTENT AND CONTENT-INDEPENDENT FLOW INFORMATION

§0. RELATED APPLICATIONS

Benefit is claimed, under 35 U.S.C. §119(e)(1), to the filing date of U.S. provisional patent application Ser. No. 60/718,384 (referred to as "the '384 provisional"), titled "APPARATUS AND METHOD FOR DETECTING AND RESPONDING TO RESOURCE ABUSES VIA CHARACTERIZATION OF FLOW CONTENT TYPE", filed on Sep. 19, 2005, and listing Kulesh SHANMUGASUNDARAM, Mehdi KHARRAZI and Nasir MEMON as the inventors, for any inventions disclosed in the manner provided by 35 U.S.C. §112, ¶ 1. The '384 provisional application is expressly incorporated herein by reference. The scope of the present invention is not limited to any requirements of the specific embodiments described in the '384 provisional application.

§1. BACKGROUND OF THE INVENTION

§1.1 Field of the Invention

The present invention concerns the administration of network resources. In particular, the present invention concerns facilitating the establishment and enforcement of effective network policies.

§1.2 Background Information

Network administrators routinely deal with a variety of abuses such as, network bandwidth by unauthorized application services, and the distribution of unauthorized content to name a few. Abusers can be malicious attackers looking for free resources to host their illegal activities, a malicious insider running a peer-to-peer hub, or simply an ill informed user unintentionally running an application proxy. Proliferation of peer-to-peer networks and wide use of tunnels makes it difficult to detect such abuses and easy to circumvent security policies.

The two most common defenses that are used to prevent network abuses are firewalls and Intrusion Detection Systems (IDS). Unfortunately, an IDS is not useful in detecting many types of abuses where the essence of the abuse is not captured by a simple set of signatures. Firewalls, on the other hand, are more effective in preventing abuse. Firewalls use port blocking to thwart unauthorized application services. For instance, if a security policy denies the use of Web servers inside a network then a firewall simply blocks traffic to port 80.

However, it is now well known that a firewall can be circumvented. For example, many firewalls do not block outbound connection requests. A malicious insider, or a host inside the network compromised by an attacker, can initiate a connection and transfer unauthorized data or make available an unauthorized service without being detected by a firewall. Another simple way to bypass the firewall would be to simply run the unauthorized service on a port that the firewall allows traffic on. For example, if the firewall blocks services on port 80 and leaves port 22 open so that users can telecommute, then a Web server can be configured to use port 22, thereby circumventing the security policy. A third way to get past the firewall is by tunneling. Tunneling works by encapsulating a network protocol within packets carried by another protocol. So in the above example, with the presence of a suitable proxy on the inside host, Web traffic could be tunneled through secure shell (SSH) traffic on port 22. Similarly, there are many other techniques to get past a firewall, given a malicious insider or a captured host inside the target network.

Firewall circumvention techniques present new challenges in abuse detection. Some abuse detection techniques simply use port blocking or bandwidth throttling. Routers simply monitor the bandwidth usage of hosts and enforce throttling when it exceeds a preset limit. However, this is not always an effective solution as the bandwidth may be used for legitimate purposes.

There have been some research work in identifying application types in the presence of weak port binding. (See, e.g., James P. Early, Carla E. Brodley, and Catherine Rosenberg, "Behavioral Authentication of Server Flows," *Nineteenth Annual Computer Security Applications Conference*, pp. 46-55 (Las Vegas, Nev., USA, December 2003); and K. M. C. Tan and B. S. Collie, "Detection and Classification of TCP/IP Network Services," *Thirteenth Annual Computer Security Applications Conference*, pp. 99-107 (San Diego, Calif., USA, December 1997). These techniques identify types of application using packet traces and machine learning algorithms. The present inventors believe that one of the disadvantages of such techniques is the potential for false positives where an application can be identified wrongly (as another application).

The present inventors have described techniques for flow content characterization (i.e., the ability to classify network packet contents as belonging to one of a set of data types like audio data, encrypted data, video data etc., though not necessarily the identity of the application being used). (See Kulesh Shanmugasundaram, Mehdi Kharrazi, Nasir Memon, "Nabs: A System for Detecting Resource Abuses via Characterization of Flow Content Type," *Annual Computer Security Applications Conference* (Tucson, Ariz., 2004), and Mehdi Kharrazi, Kulesh Shanmugasundaram, Nasir Memon, "Network Abuse Detection via Flow Content Characterization," *5th Annual IEEE Information Assurance Workshop* (West Point, N.Y., 2004).) Other techniques characterize flow content using the media headers of various file types, like the "file (1)" command on Unix systems. Such approaches have shortcomings. For example, since media headers (e.g., JPEG headers, MPEG headers, etc.) can be modified easily, it is easy to circumvent techniques that rely on the header information. Further, since not every single packet contains header information, header-based monitoring techniques typically must examine each packet on the network. For instance, suppose there is a 200 KB JPEG image. When transmitted over network, this image will be split into approximately 200 packets, only one of which contains the header. A header-based monitoring system must be able to examine each packet on the network for the string "JFIF" to determine the content type is a JPEG image. Such a method might also result in false positives as the string "JFIF" could appear in a JPEG image or in a text file. In order to minimize such false positives the method would require some context information be maintained to properly identify the text. As the foregoing example illustrates, such techniques may be very expensive in terms of computational and memory resources and therefore might not be practical on large networks, especially if traffic volume is high. Besides, packet drops and asymmetric routing may result in such techniques losing the packet that contains the header information rendering it useless. Also note that some media types do not have headers at all. For example, plaintext and encrypted content usually have no headers to indicate their content type.

Finally, the present inventors believe that enforcing policies only of the basis of content type is too inflexible in many instances.

As can be appreciated from the foregoing, it would be useful to have improved techniques for enforcing network policies. It would be useful is such techniques did not need to rely on information in packet headers, or port information.

It would also be useful to permit the definition and enforcement of rich and flexible policies.

§2. SUMMARY OF THE INVENTION

Embodiments consistent with the present invention provide improved techniques for enforcing more flexible network policies. Such techniques do not need to rely on information in packet headers, or port information.

At least some embodiments consistent with the present invention might provide improved techniques for enforcing flexible network policies by (a) obtaining network packets, (b) grouping the collected network packets into a plurality of flows, (c) for each of the plurality of flows, (i) determining a content characteristic by characterizing content of the flow using bit-stream level statistics, and (ii) determining content-independent flow characteristics, port-independent flow characteristics, and/or application header-independent flow characteristics, and (d) enforcing a policy on at least one of the flows using both (1) the determined content characteristic and the (2) determined content-independent flow characteristics, port-independent flow characteristics, and/or application header-independent flow characteristics.

At least some embodiments consistent with the present invention might provide improved techniques for enforcing flexible network policies by (a) obtaining a flow of network packets, (b) determining a content characteristic by characterizing content of the flow using bit-stream level statistics, (c) determining content-independent flow characteristics, port-independent flow characteristics, and/or application header-independent flow characteristics, and (d) enforcing a policy on the flow using both (1) the determined content characteristic and the (2) determined content-independent flow characteristics, port-independent flow characteristics, and/or application header-independent flow characteristics.

§3. BRIEF DESCRIPTION OF THE DRAWINGS

§4. DETAILED DESCRIPTION

The present invention may involve novel methods, apparatus, message formats, and/or data structures for improving the definition and enforcement of network policies. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

"Abuse" can be defined as an act considered unacceptable by the community sharing resources or by an entity authorized to administer resources. In the presence of a use-policy, which formally defines acceptable usage of resources, abuse can be defined precisely as any deviation from the use-policy.

§4.1 Exemplary Apparatus

Figure 1:
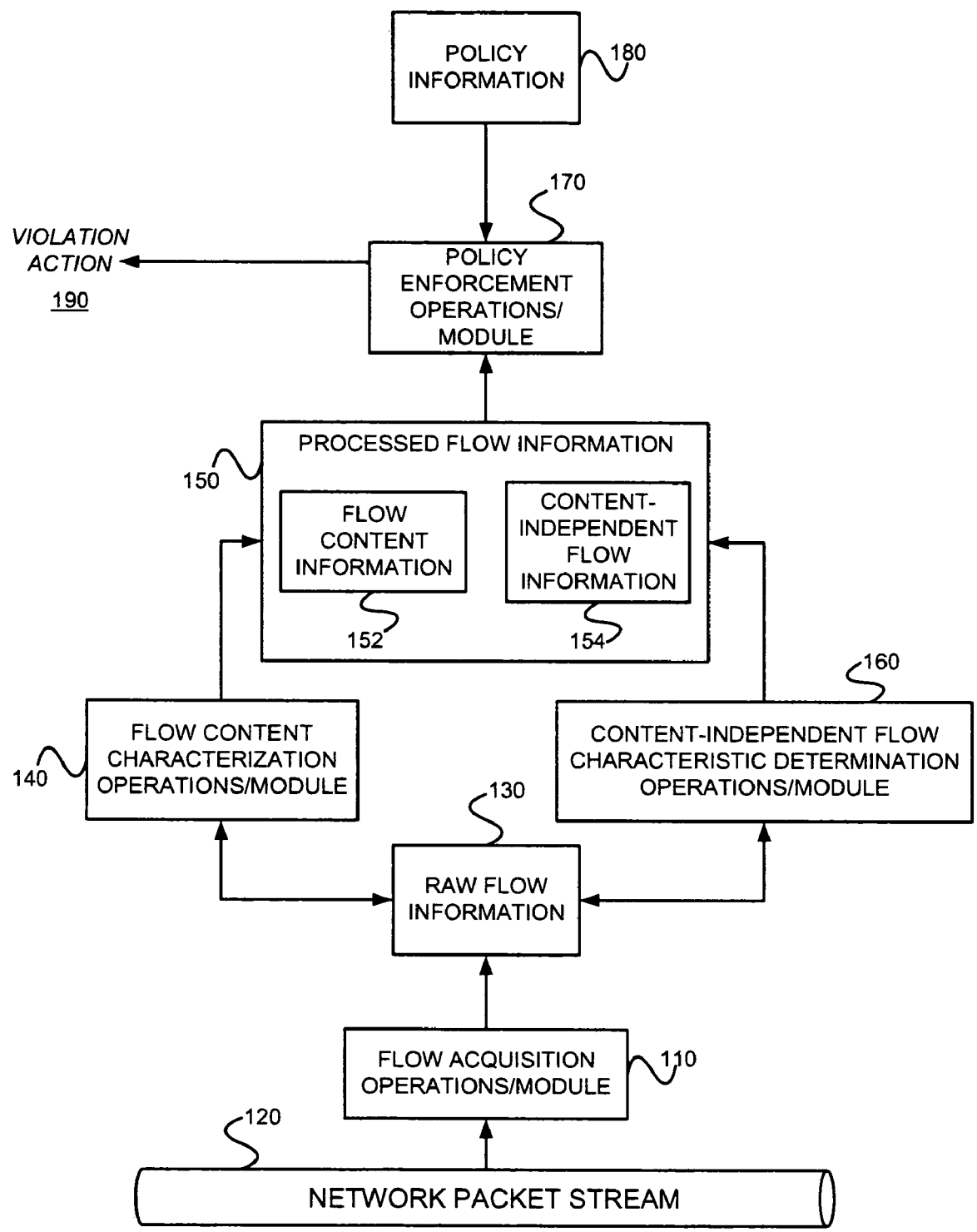
FIG. 1 is a block diagram of an exemplary embodiment consistent with the present invention.

FIG. 1 is a block diagram of an exemplary embodiment 100 consistent with the present invention. The exemplary embodiment 100 includes a flow acquisition operations/module 110, a flow content characterization operations/module 140, content-independent flow characteristic determination operations/module 160, and policy enforcement operations/module 170.

The flow acquisition operations/module 110 might acquire flows from a stream of network packets 120 and store raw flow information 130. The flow content characterization operations/module 140 might process the raw flow information 130 (or a derivative thereof) to generate processed flow information 150, such as flow content information 152. Similarly, the content-independent (or port-independent, or packet header-independent) flow characteristic determination operations/module 160 might process the raw flow information 130 to generated processed flow information 150, such as content-independent (or port-independent, or packet header-independent) flow information 154. The policy enforcement operations/module 170 might use the processed flow information, such as the flow content information 152 and the content-independent (or port-independent, or packet header-independent) flow information 154, together with policy information 180, to determine whether or not a policy violation occurred. If so, it 170 might issue a violation action 190.

As can be appreciated from the foregoing, instead of, or in addition to, the content-independent flow characteristic determination operations/module 160, a port number agnostic flow characteristic determination operations/module and/or an application header agnostic flow characteristic determination operations/module might be provided.

§4.2 Exemplary Methods

Figure 2:
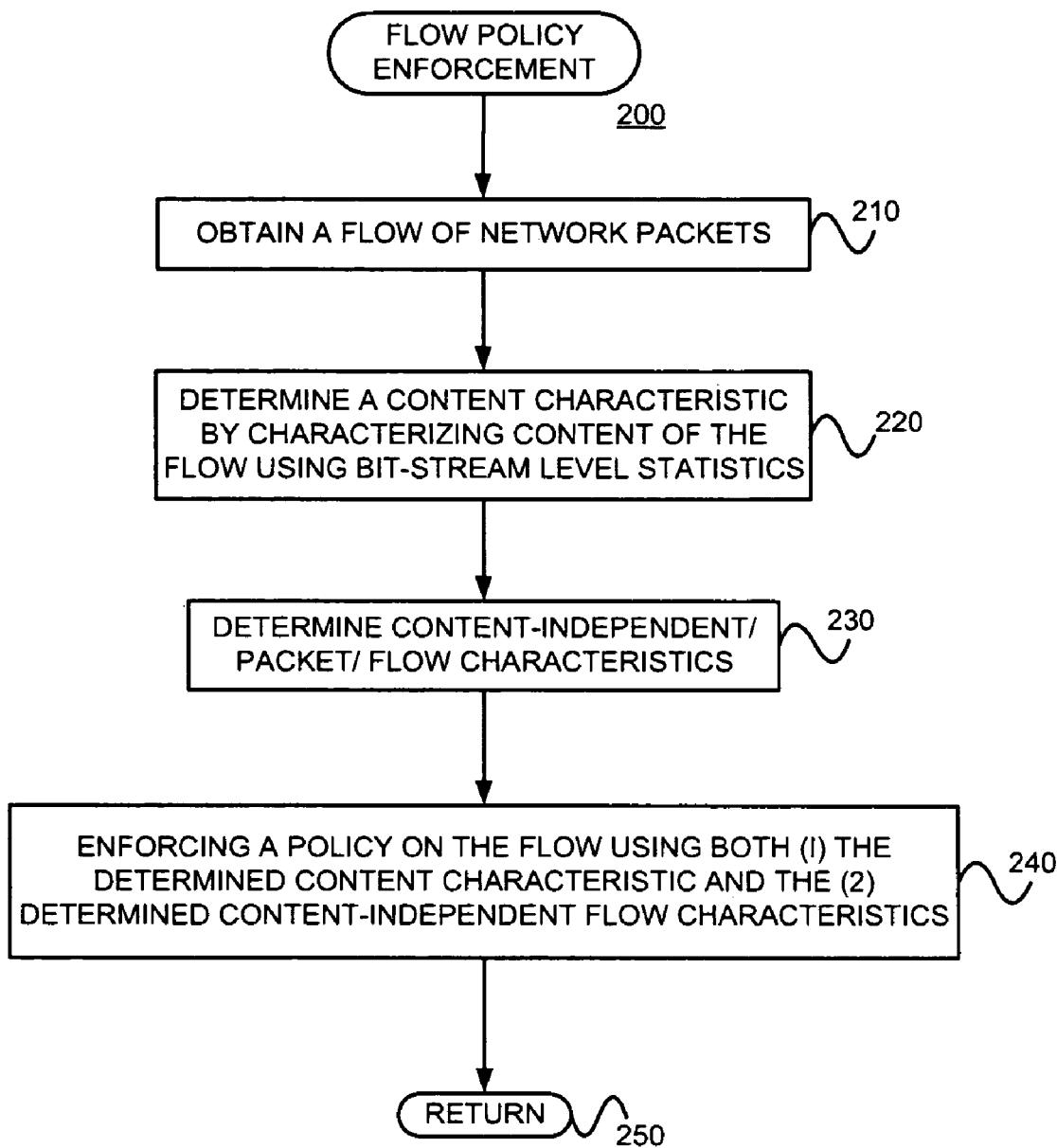
FIG. 2 is a flow diagram of an exemplary method consistent with the present invention.

FIG. 2 is a flow diagram of an exemplary method 200 consistent with the present invention. A flow of network packets is obtained. (Block 210) A content characteristic of the packets is then determined by characterizing content of the flow using bit-stream level statistics. (Block 220) Content-independent flow characteristics (and/or port-independent flow characteristics, and/or application header-independent flow characteristics) are then determined. (Block 230) Finally, a policy on the flow is enforced using both (1) the determined content characteristic and (2) the determined content-independent flow characteristics (and/or port-independent flow characteristics, and/or application header-independent flow characteristics) (Block 240) before the method 200 is left (Node 250).

Referring back to block 220, the content characteristic might be selected from a group of characteristics consisting of (A) text, (B) bitmap, (C) wave, (D) zip, (E) JPEG, (F) MP3, (G) encrypted and (H) compiled machine instructions. Exemplary techniques for determining content characteristics are described in section 4.4.2 below.

Referring back to block 230, the content-independent flow characteristics might include at least one of (A) a number of packets in the flow, (B) a number of bytes in the flow, (C) inter-packet arrival time, (D) packet sizes, (E) distribution of inter-packet arrival times, (F) distribution of packet sizes, (G) time-to-live values, (H) time-to-live value distributions, (I) sequence number, (J) distribution of sequence numbers, (K) acknowledgement numbers, (L) distribution of acknowledgement numbers, (M) identification numbers, (N) distribution of identification numbers, (O) fragmentation offsets, (P) distribution of fragmentation offsets, (Q) window sizes, and (R) distribution of window sizes. Such information might be processed to determine other content-independent flow characteristics such as, for example, (A) streaming or not (e.g., based on whether the packet sizes are constant or not, and packet inter-arrival times), (B) interactive session or not (e.g., based on packet inter-arrival time distribution), etc.

Referring back to block 240, the policy might include flow characteristic limits for various content types. For example, one policy might be to allow streaming audio, but not streaming video. This policy might include a limit on the packet rate. As another example, a policy might be to block encrypted interactive sessions, but allow text sessions. Naturally, numerous policies are possible as by passing only, and/or blocking, various combinations of one or more content types and one or more content-independent flow characteristics.

§4.3 Exemplary Data Structures

Figure 3:
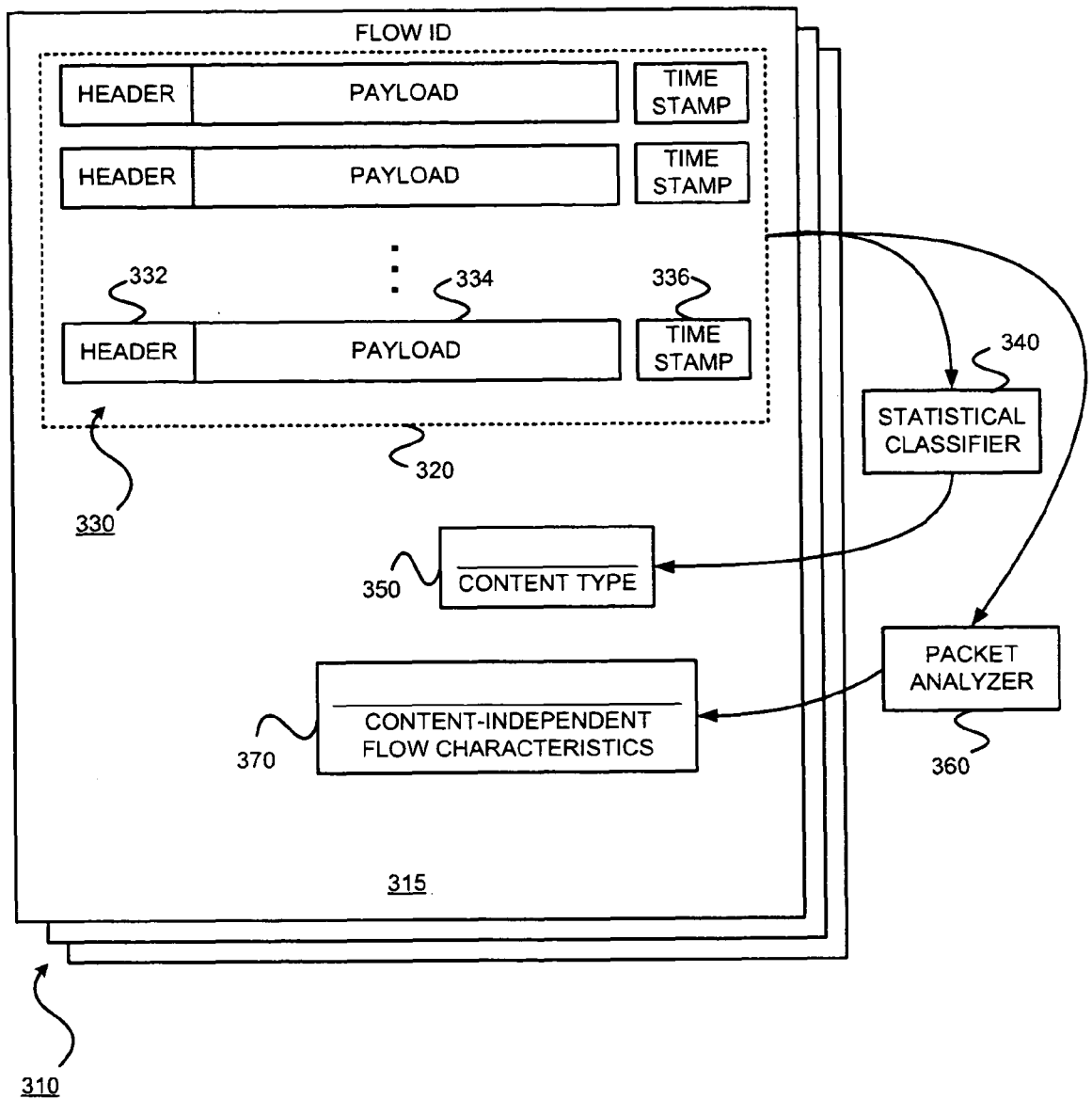
FIG. 3 illustrates exemplary data structure, consistent with the present invention, of stored flow data.

FIG. 3 illustrates exemplary data structure 310, consistent with the present invention, of stored flow data. Referring back to FIG. 1, the data structure 310 may be used to store raw flow information 130 and/or processed flow information 150. The information 310 may include various information 315 for each of a number of flow IDs. The information 315 may include raw flow information 320, content type information 350, and content-independent flow characteristics information 370.

The raw flow information 320 might include various packet information 330, each of which might-include header information 332, payload information 334 and time stamp information 336.

Statistical classifier 340 may process the raw flow information 320 to determine a content type for the flow, which is stored as content type information 350.

Packet analyzer 360 may process the raw flow information 320 to determine content-independent flow characteristics for the flow, which is stored as content-independent flow characteristics information 370.

§4.4 Refinements, Alternatives and Extensions

Figure 4:
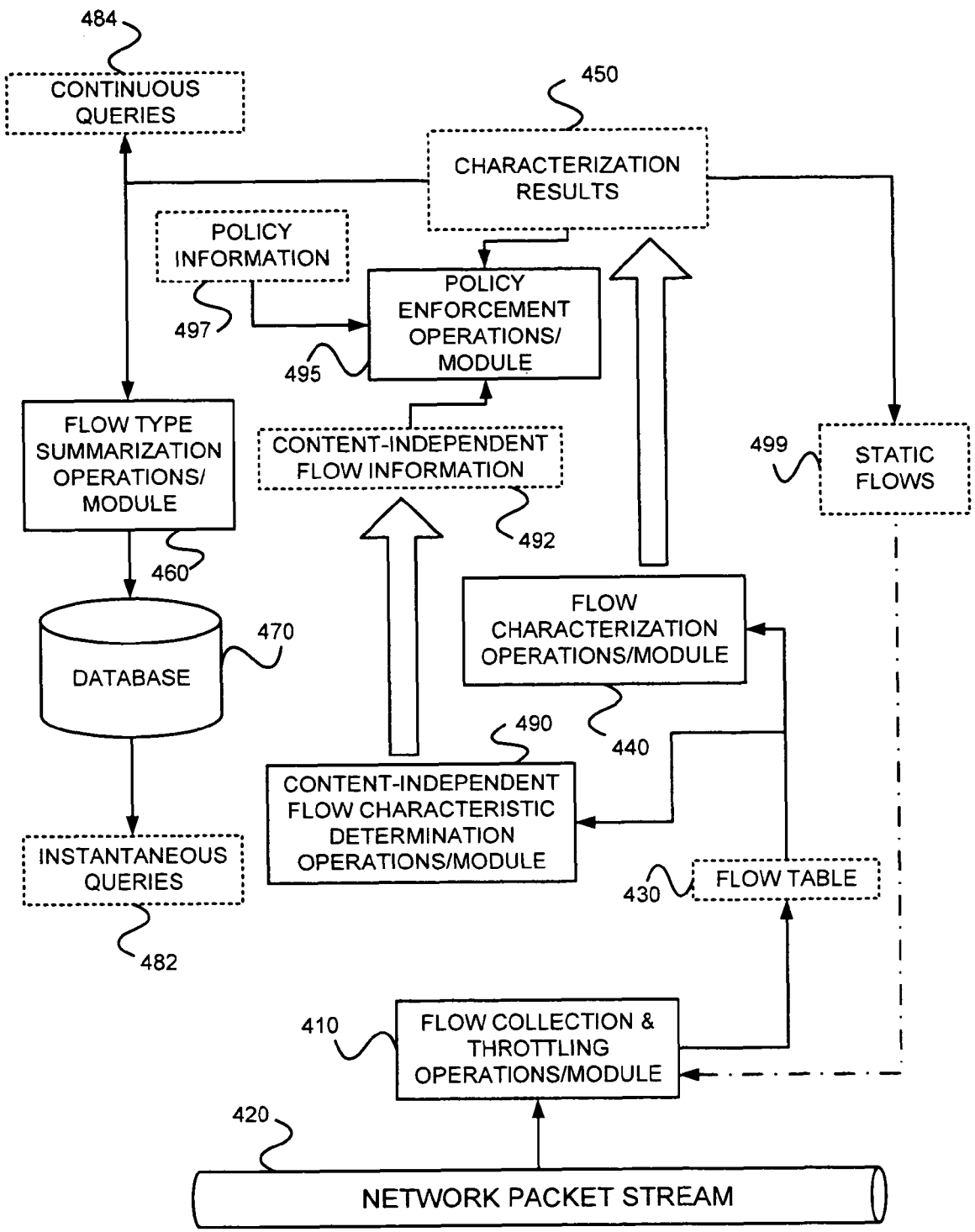
FIG. 4 is a block diagram of another exemplary embodiment consistent with the present invention.

FIG. 4 is a block diagram of another exemplary embodiment consistent with the present invention. The exemplary embodiment includes a flow collecting and throttling operations/module 410, a flow content characterization operations/module 440, flow type summarization operations/module 460, content-independent flow characteristic determination operations/module 490, and policy enforcement operation/module 495.

The flow collection and throttling operations/module 110 might acquire flows from a stream of network packets 420 and store information in flow table 430. The flow content characterization operations/module 440 might then use information stored in the flow table 430 to generate content characterization results 450. Similarly, the content-independent flow characteristic determination operations/module 490 might use information stored in the flow table 430 to generate content-independent flow information 492. Finally, policy enforcement operations/module 495 might use both the characterization results 450 and the content-independent flow information 492 to enforce one or more policies stored as policy information 497.

Referring back to 410 and 430, in some embodiments consistent with the present invention, a "flow" may be defined as a set of packets that have identical quine-tuple Protocol, SourceIP, DestinationIP, SourcePort, DestinationPort. A flow collection component might sniff the network and capture all traffic passing through a monitoring point. Packet capture and filtering might be performed using libpcap and BPF filters. (See, e.g., libpcap packet capture library at http://www.tcpdump.org/.) Packets that pass through the filter might then be grouped into flows and scheduled in the flow table 430 to be picked up for characterization by the flow content characterization operations/module 440.

Referring back to 440, in some embodiments consistent with the present invention, the flow table 430 might be continuously swept for flows that have accumulated necessary data (e.g., 16 KB of payload). (As discussed in the '384 provisional, the present inventors found that the classification accuracy begins to saturate as the features are computed over payloads larger than 16 KB.) In such embodiments, when such a flow is found, it is removed from the flow table 430 and processed to identify the type of its content. Output from flow characterization operations/module 440 might be of the form <time, flow-id, flow-type 3 [,auxiliary-data]>. Such information might be stored in a database 470, and/or used to answer queries in real-time as described below. Flow-ID might be the concatenation of quine-tuple mentioned above. Flow-type might be the content type of the flow as determined by the classifier. Finally, auxiliary-data might include the number of packets and/or bytes in the flow.

Output generated from the flow content characterization operations/module 440 can be stored directly to a database 470. However, the storage space required to store this data might outweigh the usefulness of such fine-grained data. In some embodiments consistent with the present invention, storage requirements can be eased by summarizing characterization results 450 without loosing too much information in the process. For example, a simple summarization technique might merge duplicate {flow-ids, flow-type} pairs from the results 450 and store the resulting data set in database 470.

In some embodiments consistent with the present invention, a user can extract desired information from the database 470 via a user interface (not shown) using a SQL-like query language. Query processing operations/module (not shown) might include two main components. A first might handle continuous queries 484 and the second might handle instantaneous or one-time queries 482. Continuous queries 484 might be used to process the content characterization results 450 as a stream and update the results in real-time. Continuous queries 484 are useful for monitoring networks in real-time for determined information such as, for example, "What are the top-k sources of audio in the network now?"or "What are the type of flows emanating from host x now?" Instantaneous queries 482, on the other hand, might be carried out on data stored in the database 470. Such queries 482 are useful for later analysis of events.

Figure 5:
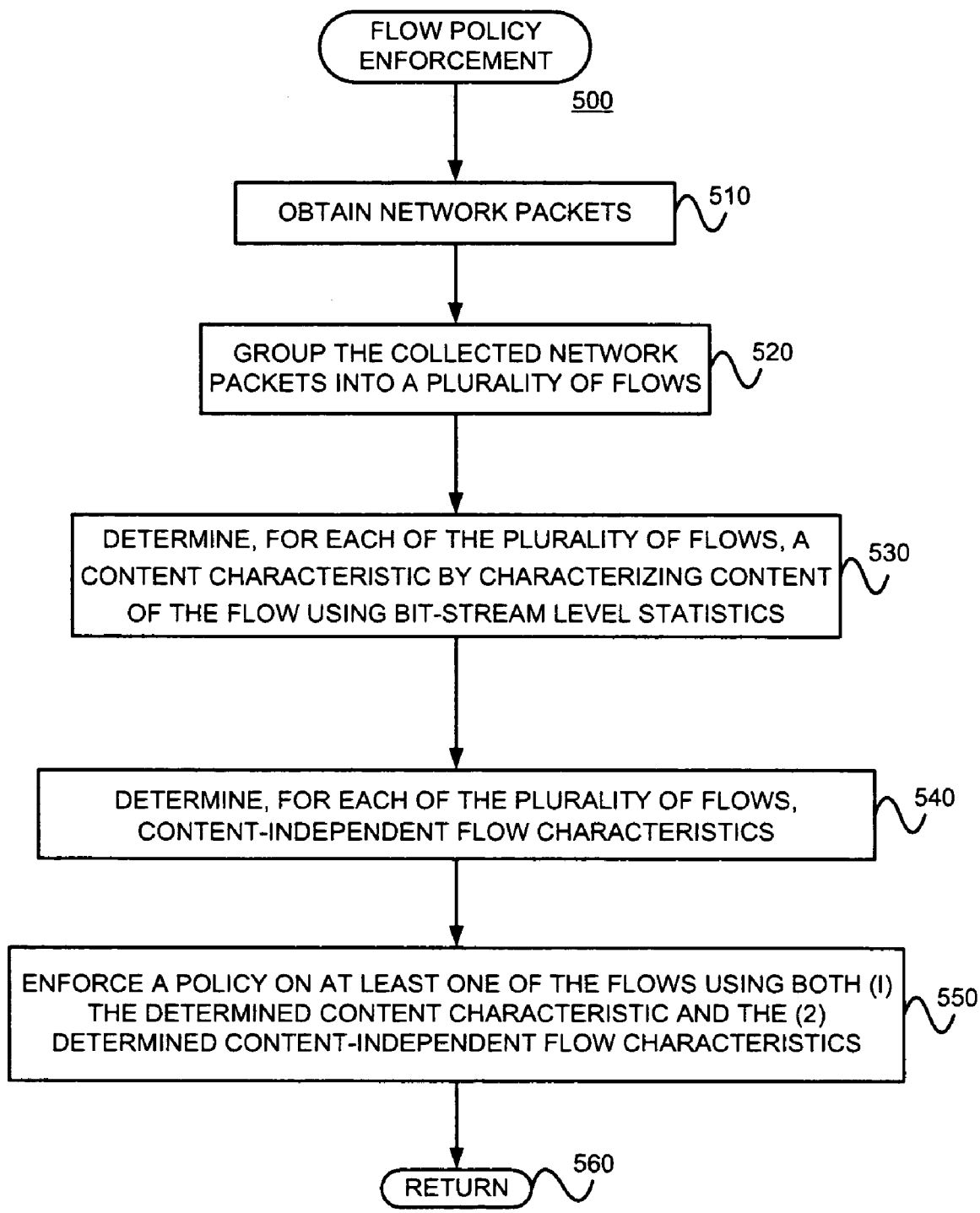
FIG. 5 is a flow diagram of another exemplary method consistent with the present invention.

FIG. 5 is a flow diagram of another exemplary method 500 consistent with the present invention. Network packets are obtained. (Block 510) Then, the collected network packets are grouped into a plurality of flows. (Block 520) For each of the plurality of flows, a content characteristic is determined by characterizing content of the flow using bit-stream level statistics (Block 530) and content-independent flow characteristics (and/or port-independent flow characteristics, and/or application header-independent flow characteristics) are determined (Block 540). Finally, a policy is enforced on at least one of the flows using both (1) the determined content characteristic and the (2) determined content-independent flow characteristics (and/or port-independent flow characteristics, and/or application header-independent flow characteristics) (Block 550) before the method 500 is left (Node 560).

Referring back to block 510, the act of obtaining network packets might include sniffing the network, and capturing all traffic passing through a monitoring point. Exemplary techniques for flow collection and throttling are described in section 4.4.1 below.

Referring back to block 520, assuming that each of the network packets includes a network protocol, Source (IP) Address, Destination (IP) Address, Source Port and Destination Port, the act of grouping the collecting network packets into a plurality of flows might include (i) defining each of the plurality of flows based on network protocol, Source (IP) Address, Destination (IP) Address, Source Port and Destination Port, and (ii) for each of the network packets, assigning the packet to an appropriate one of the plurality of flows based on the network protocol, Source (IP) Address, Destination (IP) Address, Source Port and Destination Port of the network packet.

Referring back to block 530, the content characteristic might be selected from a group of characteristics consisting of (A) text, (B) bitmap, (C) wave, (D) zip, (E) JPEG, (F) MP3, (G) encrypted, and (H) compiled machine instructions.

Referring back to block 540, the content-independent flow characteristics might include at least one of (A) a number of packets in the flow, (B) a number of bytes in the flow, (C) inter-packet arrival time, (D) packet sizes, (E) distribution of inter-packet arrival times, (F) distribution of packet sizes, (G) time-to-live values, (H) time-to-live value distributions, (I) sequence number, (J) distribution of sequence numbers, (K) acknowledgement numbers, (L) distribution of acknowledgement numbers, (M) identification numbers, (N) distribution of identification numbers, (O) fragmentation offsets, (P) distribution of fragmentation offsets, (Q) window sizes, and (R) distribution of window sizes.

Referring back to block 550, the policy might includes flow characteristic limits for various content types. The act of enforcing a policy on at least one of the flows might include (i) determining whether or not the flow violates the policy, and (ii) storing the policy violation in association with a source or destination of the flow if it is determined that the flow violates the policy. If it is determined that the flow violates the policy, then a user who (or client device that) violated the policy might be identified using a directory service (e.g., Lightweight Directory Access Protocol (LDAP), Active Directory, etc.). If it is determined that the flow violates the policy, then a request to impede or stop the flow might be issued.

§4.4.1 Exemplary Flow Collection and Throttling

Flow characterization may require a certain minimum amount of payload per flow to determine the content type effectively. In some embodiments consistent with the present invention, flows are buffered in the flow table 430 until the required payload is accumulated. (As discussed in the '384 provisional, the present inventors found that the classification accuracy begins to saturate as the features are computed over payloads larger than 16 KB.) Under such an arrangement, a garbage collection operation may be used to prevent flows that do not carry the required minimum from occupying memory. More specifically, two major factors prevent optimizing memory utilization. First, small insignificant flows take up valuable space in the flow table 430 which might prevent interesting flows from being buffered. Second, even among the interesting flows, it might not be necessary to analyze or process every single packet to characterize the flow. Therefore, in some exemplary embodiments consistent with the present invention, operations throttle packets based on a preset strategy. (Note that since the system is a passive monitor, "throttling" means throttling flows entering the system, not throttling the flows themselves.)

Throttling flows might require tracking of flow rates (e.g., packets per second, or bandwidth) of all flows entering the system. A naive approach of building a table to keep track of flows would likely consume too much memory. Therefore, an efficient and flexible way of measuring flow rates would be useful. Various data structures and algorithms have been developed for this purpose. Although any of these data structures or algorithms might be used, at least some embodiments consistent with the present invention use lossy counting. (See, e.g., Gurmeet Singh Manku and Rajeev Motwani, "Approximate frequency counts over data streams," *Proceedings of the 28th VLDB Conference*, (Hong Kong, China, November 2002).)

Lossy counting is a streaming algorithm that can deterministically compute approximate frequency counts of elements exceeding a user-specified threshold in a space-efficient manner. More formally, suppose N denotes the length of current stream and s, $\epsilon$ are two user specified parameters (support and error, respectively). Lossy counting estimates the frequency of elements in the stream whose true frequency exceeds sN with the guarantee that the estimated frequencies are utmost $\epsilon$N less than the true frequencies by using utmost $1/\epsilon \log(\epsilon N)$ space.

Using lossy counting for tracking flow has a number of advantages. First, among the many probabilistic algorithms, lossy counting is one of the few deterministic algorithms that can maintain an $\epsilon$-deficient synopsis of data within error bounds specified by user. Second, lossy counting is a one-pass algorithm, which means lossy counting computes the necessary information on a single pass over the data. Consequently, it is well suited for processing network streams. Third, lossy counting is computationally efficient, requiring only a few additions and comparisons per packet. The data structure is easy to maintain, has small memory footprint, and self pruning.

Some embodiments consistent with the present invention using lossy counting to keep track of the flow rate of each flow obtain, at bucket boundaries, a list of flows which exceeds the user-specified threshold s. All flows that do not satisfy this threshold are discarded and those that satisfy the threshold are put into the flow table 430. For example, setting $\epsilon=0.001$ and s=0.01 would result in flows that exceed 1% of total traffic be placed in the flow table 430. Since lossy counting has no false negatives, none of the flows above 1% will be missed. However, flows that are between 0.9% and 1% might or might not appear in the stream and are false positives. This is an acceptable trade-off between accuracy and resources since flows of interest (above 1% of total traffic) will not be missed and most of the flows that are not of interest (below 0.9%) will not be stored (though some overhead for processing the false positives (between 0.9% and 1%) will be incurred).

The foregoing exemplary throttling technique and packet filtering together permits control over precisely which flows should be monitored by the system. For instance, it permits the flexibility to specify something like "consider only TCP or UDP flows to or from ports above 1024 that occupy more than 1% of total traffic." This is a considerable advantage when monitoring traffic on large networks.

Throttling under some exemplary embodiments consistent with the present invention may operate as follows. The data stream is conceptually divided into buckets of width $$\omega = \left\lceil \frac{1}{\varepsilon} \right\rceil$$

elements each. In such exemplary embodiments, buckets might be labeled with bucket IDs starting with 1. Let the current bucket ID be $b_{current}$, whose value is $\in N$. A table D of rows of the form (e, f, $\Delta$) might be maintained where e is the element, f is the frequency, and $\Delta$ is the value of $(b_{current}-1)$ when e was inserted into the table. Initially D is empty. Whenever an element e arrives, the exemplary method might first look up table D to see if the element is listed. If so, then the frequency f might be incremented by one for the corresponding entry. Otherwise, an entry of the form $(e, 1, b_{current}-1)$, might be inserted into table D. Table D might be pruned at bucket boundaries, whenever $N \equiv (0 \mod \omega)$, by removing entries where $f+\Delta \leq b_{current}$. Note that for an entry e in table D, f denotes the exact frequency of e ever since it is inserted into the table D. Now to find elements exceeding threshold s, each of the entries in the table D might be examined, and entries where $f \geq (s-\epsilon)N$ might be extracted.

Although some of the exemplary flow collection and throttling techniques were described as using lossy counting, other data stream algorithms might be used instead. (See, e.g., S. Muthukrishnan "Data streams: Algorithms and applications," at http://www.cs.rutgers.edu/muthu/ccmfun.pdf.)

§4.4.2 Exemplary Flow Content Characterization

Recall that flow characterization operations/module 440 is responsible for determining content types of flows buffered in the flow table 430. In some embodiments consistent with the present invention, the payload of each packet may be represented as a vector of integers, which may be used to distinguish between a variety of flow content types. The integers may be statistical measurements of the flow. Thus, such embodiments may distinguish these vectors based on their respective statistical signatures. The statistical measures used in an exemplary embodiment consistent with the present invention can be grouped into three categories —time domain, frequency domain, and higher order statistics.

A number of simple statistical measures of the flow (e.g., mean, variance, auto-correlation, and/or entropy) may be chosen from the time domain. Although some of these measures are simple and rudimentary, they help greatly in distinguishing content types. For example, one might expect that RAW data formats such as, bitmap images, or .WAV audio, to have lower entropy than compressed or encrypted formats. (This is evident in FIG. 2 of the '384 provisional, which shows the average entropy of data fragments for 1000 files in each of eight (8) major content types.) Similar reasoning justifies the use of variance and auto-correlation as well.

By inspecting the frequency domain representation of a set of byte vectors obtained from different types of files, the present inventors discovered subtle differences in frequency representations depending on the original data type. A number of statistical measures may be chosen from the frequency spectrum of the flow. The frequency spectrum might be divided into four (4) bands ranging from, $0$-$\pi/8$; $\pi/8$-$\pi/4$; $\pi/4$-$\pi/2$; and $\pi/2$-$\pi$. The mean, variance, power, and skewness of each frequency band of the flow might be determined. For example the average mean of the power in the $0$-$\pi/8$ band of the frequency spectrum can be seen in FIG. 2 of the '384 provisional.

Bicoherence, which is a third order statistic, may be used as a higher-order statistic of the flow. Bicoherence may be used to characterize non-linearities in the underlying data. Since the amount of non-linearity introduced by the compression or encryption techniques varies, bicoherence measures could be used to help distinguish these content types. In some exemplary embodiments consistent with the present invention, the bicoherence is determined. Then power of the bicoherence magnitude and phase, and the mean of the bicoherence magnitude are determined. In addition to these statistics, the kurtosis and skewness of each byte vector might be determined.

At least some of the time domain, frequency domain, and/or higher order statistics may be used to characterize a flow— to represent a flow as a feature vector of statistical values. Known classification algorithms (e.g., Neural Networks, Bayesian Networks, Support Vector Machines, etc.) may be used for purposes of classification. Some embodiments consistent with the present invention use Support Vector Machines (See, e.g., V. Vapnik, *The nature of statistical learning theory*, (Springer-Verlag, N.Y., 1995).) for classification. The RBF kernel (Radial Basis Function) may be used. The RBF kernel may be optimized by doing a grid search over its two parameters—cost and gamma. There are many implementations of SVM available on the public domain. (See, e.g., Chih-Chung Chang and Chih-Jen Lin, *LIBSVM: a library for support vector machines* (2001) with software available at http://www.csie.ntu.edu.tw/~cjlin/libsvm.)

Although all of the time domain, frequency domain, and/or higher order statistics may be used to characterize a flow—to represent a flow as a feature vector of statistical values—, some embodiments consistent with the present invention might use only a sub-set of these statistics. More specifically, some of the features described above may have very little or no information gain for purposes of distinguishing between the different categories of content. Furthermore, when implementing the actual system, speed and complexity can become an issue. Consequently, it would be useful to construct the features vectors from a subset of the most or more essential (e.g., in terms of information gain for purposes of distinguishing between different categories) statistical measures.

An information gain technique, such as the SFFS (Sequential Forward Feature Selection) algorithm (See, e.g., P. Somol, P. Pudil, J. Novovicov, and P. Paclk, "Adaptive floating search methods in feature selection," *Pattern Recognition Letters*, Vol. 20, pp. 1157-1163 (1999).) may be used to identify and extract the more or most essential subset of features. The SFFS algorithm sequentially adds or removes features and finds the best subset of features—that is, the subset of features which gives maximal information gain in the classification process. As seen in FIG. 4 of the '384 provisional, in some embodiments consistent with the present invention, optimal accuracy may be obtained by using only 6 of 25 features. In fact the accuracy has less than 1% of difference with the case that all 25 features are used. The chosen features in the order of importance are entropy, power in the first frequency band, mean, variance, mean and variance in the fourth frequency band.

As shown in FIG. 5 of the '384 provisional, although feature selection provides only marginal improvement, it greatly reduces required processing per flow.

§4.4.3 Flow Scheduling

Referring back to FIG. 4, typically, flow characterization will be slower than flow collection and throttling. Indeed, on large networks, flow characterization can become a bottleneck. Network flows can be categorized into four major groups based on packet rate over time (sustained or temporary) and content type (static or dynamic.) This is then used to scheduled the flow characterization processing of the flows. Each flow category is discussed below.

Sustained static flows have a constant packet rate for long periods of time (e.g., several minutes or hours). These flows do not change the content type during their life time. Sustained static flows are generally the result of streaming audio/video or downloading a large file (like an ISO image).

Sustained dynamic flows are similar to the above in terms of packet rate and lifetime, but the content type of the flow changes with time. Example of such flows include, accessing network file systems and downloading files via a file sharing program.

Temporary static flows are mostly bursts of traffic that last only for a few seconds or perhaps minutes at the most. Most network traffic—Web requests and emails to name a few—is of this form. These flows carry a single type of content.

Finally, temporary dynamic flows have a short lifetime like temporary static flows, but the content type changes. The change in content type might be due to a file having various types of embedded content. Examples of such flows include a flow of downloading a Postscript file with embedded image or downloading a Microsoft Word document.

As can be appreciated from the foregoing, sustained flows will occupy the classifier (of the flow characterization operations/module 440) much of the time, even though repeatedly characterizing them yields no additional information. This is especially true for sustained static flows as the flow content does not change at all. Even for sustained dynamic flows, the content type change should be gradual enough to skip a few packets in the flow.

In some embodiments consistent with the present invention, flow collection and throttling operations/module 410 might identify sustained flows (regardless of dynamic or static) and throttle them from entering the flow characterization operations/module 440. This prevents dominating flows from using the classifier of the flow characterization operations/module 440 repeatedly, thereby better balancing the use of computationally expensive classification across all four types of flows.

Within the framework of lossy counting, "sustained flows" may be defined as follows. Given a threshold s, a flow is considered to be a "sustained flow" if it was above the threshold in the past n buckets, where n is a specified (tunable) parameter. Given this definition for sustained flows, some embodiments consistent with the present invention might identify sustained flows as follows. The stream of output from the flow characterization operations/module 440 is accepted. For each element in the output stream a table D is updated as in lossy counting. In addition, if the corresponding entry satisfies (bcurrent−Δ)≧n, then the entry is removed from the table and the flow-ID is sent back to the flow collection and throttling operations/module 410. The flow collection and throttling operations/module 410 prevents packets corresponding to the flow from entering the flow table 430 for a preset epoch k. This epoch could be a time interval and/or a packet count. In one exemplary implementation, k=n. Consequently, the throttling will prevent the flow from entering the flow table 430 for next n buckets. Flow-IDs that have been throttled for the past k buckets are then removed from the flow collection and throttling operation/module 410, which then allows the corresponding flows to be classified by the flow characterization operations/module 440. This cycle continues until either the flow falls below threshold s or it is finished.

§4.4.4 Exemplary Implementations

Embodiments consistent with the present invention may be implemented in hardware (e.g., ICs, ASICs, FPGAs, general purpose processors, etc.) and/or software (e.g., stored program instructions executed by a microprocessor, such as on a personal computer). The operations described above may be performed on one or more computers. Such computers may communicate with each other via one or more networks, such as the Internet for example.

Figure 6:
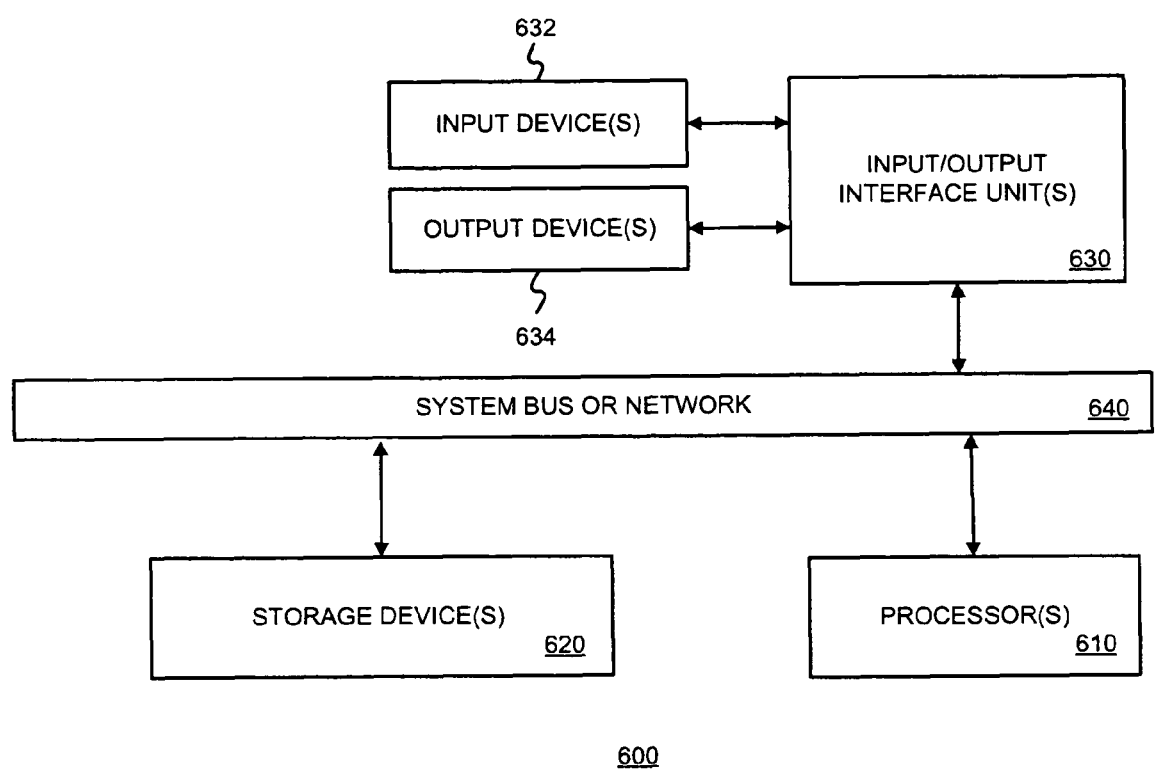
FIG. 6 is a block diagram of apparatus that may be used to perform at least some operations, and store at least some information, in a manner consistent with the present invention.

FIG. 6 is a block diagram of apparatus 600 that may be used to perform at least some operations, and store at least some information, in a manner consistent with the present invention. The apparatus 600 basically includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 620 and/or may be received from an external source via one or more input interface units 630.

In one embodiment, the machine 600 may be one or more conventional personal computers. In this case, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

Referring back to FIGS. 1 and 4, the various operations/modules may be performed by one or more machines 600. Alternatively, or in addition, various modules may be implemented in hardware.

§4.5 Exemplary Applications of Exemplary Embodiments Consistent with The Present Invention

§4.5.1 Determination of Command Channel

Attackers routinely use backdoors to communicate with the hosts they compromise. Today almost every single malware is programmed with a backdoor to rootkit a victim and helps an attacker communicate with the host via the backdoor. Generally the backdoor is used as a command channel to send various commands to the victim host by the attacker. Identifying the command channels in a network is next to impossible using the state-of-the-art intrusion detection systems or other security appliances. The identification of command channels requires stateful, port-independent analysis of a network flow characteristics. Using just the flow characteristics can yield numerous false positives because legitimate interactive sessions, such as chat or SSH sessions, can be flagged as potentially malicious command channels. Therefore, the flow characteristics should be correlated with flow content types to reduce the false positive rates and to improve the accuracy. Using an embodiment consistent with the present invention, this can be achieved by analyzing the distribution of packet sizes, inter-packet-arrival time of flows, and subsequently correlating it with content types emanating from potential victims. For example, the prominent use of command and control channels is to order a victim to download and execute files or modules from another remote host. Therefore, once a command channel is observed in a network flow to a victim host, subsequent flows to the victim can be analyzed to identify downloading of executables or compressed files by looking at the content type of flows. Such a correlation of content type and content independent flow characteristics can yield accurate results of possible attacks regardless of the malware.

§4.5.2 Determination of Network Tunnels

Network tunnels are another common menace facing many networks. An enterprise network administrator may deal with tunnels within their enterprise networks as well as tunnels protruding the perimeters. In order to identify tunnels, the flow characteristics, as well as the content carried by the flow, should be correlated. For example, an insider may tunnel an audio stream via port 80 to fool a firewall. In order to identify the stream, flow characteristics, such as packet size distribution and inter-arrival-time distribution, should be examined. Using just the flow characteristics to determine streams can induce a large number of false positives as some protocols (TCP, for example) may use KeepAlive packets (or pings) periodically to keep a connection from timing out. Therefore, the content type should also be used in order to filter our such false positives to accurately identify network tunnels. A smart adversary could create tunnels to match the usage patterns of a network. For example, an adversary may create a tunnel over a VoIP port to stream out intellectual property in the hopes of avoiding detection. In this scenario, analysis of flow content independent characteristics will fail to identify the tunnel because the tunnel is in accordance with normal usage of the port. However, using content as well as the flow characteristics can immediately identify the tunnel because even though flow characteristics match the normal usage content type would not match the normal audio content of VoIP.

§4.5.3 Determination of Steppingstones

Steppingstones are used by attackers to hide their true location on the Internet or on a large intranet. Content-independent flow characteristics such as packet side distribution, packet sizes, inter-arrival-time distribution and inter-arrival-times can be used to identify potential steppingstones in a network. A method to identifying stepping stones is presented in Yin Zhang, Vern Paxson, "Detecting Stepping Stones," *Usenix Security* (2000). In this study author discovered that there can be many legitimate steppingstones in a network. Adding content type to the detection algorithm can identify steppingstones in violation of connection policies of an organization. For example, a connection chain with inconsistent content types, such as encrypted and unencrypted channels, can be highly suspicious over an entirely encrypted connection chain. Therefore, coupling content types to the detection algorithm makes it a useful tool for creating better security policies.

§4.5.4 Determination of Application Service Anomalies

Each application service can be uniquely characterized by its flow characteristics as well as content types. For example, a web server can be characterized by the burstiness of traffic and predominantly text and JPEG/GIF images from other applications. As another example, a streaming server (e.g. such as an audio/video server) can be characterized by the small packets carrying audio or video content emanating from the server at uniform time intervals. This characterization can be applied to any host or application in a network to keep track of normal and abnormal operations of application services. Individual flows or collection of flows can be inspected to identify the type of application service and based on this determination high-level policies can be enforced. For example, a policy may be written to disallow all streaming services from one or more hosts or more narrowly streaming of audio/video.

§4.6 Conclusions

As can be appreciated from the foregoing, embodiments consistent with the present invention provide improved techniques for defining and enforcing network policies. At least some embodiments do not need to rely on information in packet headers. At least some embodiments do not need to rely on port information.

What is claimed is:

1. A machine-implemented method comprising:
   a) obtaining network packets;
   b) grouping the collected network packets into a plurality of flows;
   c) for each of the plurality of flows,
      i) determining a content characteristic by characterizing content of the flow using bit-stream level statistics, and
      ii) determining at least one of (A) content-independent flow characteristics, (B) port-independent flow characteristics, and (C) application header-independent flow characteristics; and
   d) enforcing a policy on at least one of the flows using both (1) the determined content characteristic and the (2) determined at least one of (A) content-independent flow characteristics, (B) port-independent flow characteristics, and (C) application header-independent flow characteristics,
      wherein the content characteristic is selected from a group of characteristics consisting of (A) packets of the flow include text content, (B) packets of the flow include bitmap content, (C) packets of the flow include wave content, (D) packets of the flow include zip content, (E) packets of the flow include JPEG content, (F) packets of the flow include MP3 content, (G) packets of the flow include encrypted content, and (H) packets of the flow include compiled machine instructions.

2. The machine-implemented method of claim 1 wherein the content-independent flow characteristics include at least one of (A) a number of packets in the flow, (B) a number of bytes in the flow, (C) inter-packet arrival time, (D) packet sizes, (E) distribution of inter-packet arrival times, (F) distribution of packet sizes, (G) time-to-live values, (H) time-to-live value distributions, (I) sequence number, (J) distribution of sequence numbers, (K) acknowledgement numbers, (L) distribution of acknowledgement numbers, (M) identification numbers, (N) distribution of identification numbers, (O) fragmentation offsets, (P) distribution of fragmentation offsets, (Q) window sizes, (R) distribution of window sizes, (S) streaming, (T) not streaming, (U) interactive session, and (V) not an interactive session.

3. The machine-implemented method of claim 1 wherein the act of obtaining network packets includes
   i) sniffing the network, and
   ii) capturing all traffic passing through a monitoring point.

4. The machine-implemented method of claim 1 wherein each of the network packets includes a network protocol, Source (IP) Address, Destination (IP) Address, Source Port and Destination Port, and
   wherein the act of grouping the collecting network packets into a plurality of flows includes
      i) defining each of the plurality of flows based on network protocol, Source (IP) Address, Destination (IP) Address, Source Port and Destination Port, and
      ii) for each of the network packets, assigning the packet to an appropriate one of the plurality of flows based on the network protocol, Source (IP) Address, Destination (IP) Address, Source Port and Destination Port of the network packet.

5. The machine-implemented method of claim 1 wherein the policy includes flow characteristic limits for various content types.

6. The machine-implemented method of claim 1 wherein the act of enforcing a policy on at least one of the flows includes
   determining whether or not the flow violates the policy, and
   storing the policy violation in association with a source or destination of the flow if it is determined that the flow violates the policy.

7. The machine-implemented method of claim 1 further comprising:
   e) determining whether or not the flow violates the policy, and
   f) if it is determined that the flow violates the policy, then identifying, using a directory service, a user who, or client device that, violated the policy.

8. The machine-implemented method of claim 7 wherein the directory service is selected from a groups consisting of Lightweight Directory Access Protocol and Active Directory.

9. The machine-implemented method of claim 1 wherein the act of enforcing a policy one at least one of the flows includes
   determining whether or not the flow violates the policy, and
   issuing a request to impede or stop the flow if it is determined that the flow violates the policy.

10. The machine-implemented method of claim 1 wherein the act of determining, for each of the plurality of flows, at least one of (A) content-independent flow characteristics, (B) port-independent flow characteristics, and (C) application header-independent flow characteristics, determines content-independent flow characteristics, and
    wherein the act of enforcing a policy on at least one of the flows uses both (i) the determined content characteristic and the (2) determined content-independent flow characteristics.

11. The machine-implemented method of claim 1 wherein the act of determining, for each of the plurality of flows, at least one of (A) content-independent flow characteristics, (B) port-independent flow characteristics, and (C) application header-independent flow characteristics, determines port number-independent flow characteristics, and
    wherein the act of enforcing a policy on at least one of the flows uses both (i) the determined content characteristic and the (2) determined port number-independent flow characteristics.

12. The machine-implemented method of claim 1 wherein the act of determining, for each of the plurality of flows, at least one of (A) content-independent flow characteristics, (B) port-independent flow characteristics, and (C) application header-independent flow characteristics, determines application header-independent flow characteristics, and
    wherein the act of enforcing a policy on at least one of the flows uses both (i) the determined content characteristic and the (2) determined application header-independent flow characteristics.

13. A machine-implemented method comprising:
    a) obtaining a flow of network packets;
    b) determining a content characteristic by characterizing content of the flow using bit-stream level statistics;
    c) determining at least one of (i) content-independent flow characteristics, (ii) port-independent flow characteristics, and (iii) application header-independent flow characteristics; and
    d) enforcing a policy on the flow using both (1) the determined content characteristic and the (2) determined at least one of (i) content-independent flow characteristics, (ii) port-independent flow characteristics, and (iii) application header-independent flow characteristics,
       wherein the content characteristic is selected from a group of characteristics consisting of (A) packets of the flow include text content, (B) packets of the flow include bitmap content, (C) packets of the flow include wave content, (D) packets of the flow include zip content, (E) packets of the flow include JPEG content, (F) packets of the flow include MP3 content, (G) packets of the flow include encrypted content, and (H) packets of the flow include compiled machine instructions.

14. The machine-implemented method of claim 13 wherein the content-independent flow characteristics include at least one of (A) a number of packets in the flow, (B) a number of bytes in the flow, (C) inter-packet arrival time, (D) packet sizes, (E) distribution of inter-packet arrival times, (F) distribution of packet sizes, (G) time-to-live values, (H) time-to-live value distributions, (I) sequence number, (J) distribution of sequence numbers, (K) acknowledgement numbers, (L) distribution of acknowledgement numbers, (M) identification numbers, (N) distribution of identification numbers, (O) fragmentation offsets, (P) distribution of fragmentation offsets, (Q) window sizes, (R) distribution of window sizes, (S) streaming, (T) not streaming, (U) interactive session, and (V) not an interactive session.

15. The machine-implemented method of claim 13 wherein the policy includes flow characteristic limits for various content types.

16. The machine-implemented method of claim 13 wherein the act of determining at least one of (i) content-independent flow characteristics, (ii) port-independent flow characteristics, and (iii) application header-independent flow characteristics, determines content-independent flow characteristics, and
    wherein the act of enforcing a policy on at least one of the flows uses both (i) the determined content characteristic and the (2) determined content-independent flow characteristics.

17. The machine-implemented method of claim 13 wherein the act of determining at least one of (i) content-independent flow characteristics, (ii) port-independent flow characteristics, and (iii) application header-independent flow characteristics, determines port number-independent flow characteristics, and
 wherein the act of enforcing a policy on at least one of the flows uses both (i) the determined content characteristic and the (2) determined port number-independent flow characteristics.

18. The machine-implemented method of claim 13 wherein the act of determining at least one of (i) content-independent flow characteristics, (ii) port-independent flow characteristics, and (iii) application header-independent flow characteristics, determines application header-independent flow characteristics, and
 wherein the act of enforcing a policy on at least one of the flows uses both (i) the determined content characteristic and the (2) determined application header-independent flow characteristics.

19. Apparatus comprising:
a) means for obtaining network packets;
b) means for grouping the collected network packets into a plurality of flows;
c) means, for each of the plurality of flows, for
 i) determining a content characteristic by characterizing content of the flow using bit-stream level statistics, and
 ii) determining at least one of (A) content-independent flow characteristics, (B) port-independent flow characteristics, and (C) application header-independent flow characteristics; and
d) means for enforcing a policy on at least one of the flows using both (1) the determined content characteristic and the (2) determined at least one of (A) content-independent flow characteristics, (B) port-independent flow characteristics, and (C) application header-independent flow characteristics,
 wherein the content characteristic is selected from a group of characteristics consisting of (A) packets of the flow include text content, (B) packets of the flow include bitmap content, (C) packets of the flow include wave content, (D) packets of the flow include zip content, (E) packets of the flow include JPEG content, (F) packets of the flow include MP3 content, (G) packets of the flow include encrypted content, and (H) packets of the flow include compiled machine instructions.

20. Apparatus comprising:
a) means for obtaining a flow of network packets;
b) means for determining a content characteristic by characterizing content of the flow using bit-stream level statistics;
c) means for determining at least one of (i) content-independent flow characteristics, (ii port-independent flow characteristics, and (iii) application header-independent flow characteristics; and
d) means for enforcing a policy on the flow using both (1) the determined content characteristic and the (2) determined at least one of (i) content-independent flow characteristics, (ii) port-independent flow characteristics, and (iii) application header-independent flow characteristics,
 wherein the content characteristic is selected from a group of characteristics consisting of (A) packets of the flow include text content, (B) packets of the flow include bitmap content, (C) packets of the flow include wave content, (D) packets of the flow include zip content, (E) packets of the flow include JPEG content, (F) packets of the flow include MP3 content, (G) packets of the flow include encrypted content, and (H) packets of the flow include compiled machine instructions.

* * * * *